(12) United States Patent
O'Rourke et al.

(10) Patent No.: US 7,738,452 B1
(45) Date of Patent: Jun. 15, 2010

(54) TECHNIQUES FOR LOAD BALANCING SUBSCRIBER-AWARE APPLICATION PROXIES

(75) Inventors: Christopher C. O'Rourke, Apex, NC (US); Robert Batz, Raleigh, NC (US); Kevin Shatzkamer, New York City, NY (US)

(73) Assignee: Cisco Technology, Inc., San Jose, CA (US)

( * ) Notice: Subject to any disclaimer, the term of this patent is extended or adjusted under 35 U.S.C. 154(b) by 931 days.

(21) Appl. No.: 11/158,751

(22) Filed: Jun. 22, 2005

(51) Int. Cl.
*H04L 12/28* (2006.01)
*H04L 12/56* (2006.01)

(52) U.S. Cl. ...................... 370/389; 370/401
(58) Field of Classification Search .................. 370/351, 370/389, 400, 401
See application file for complete search history.

(56) References Cited

U.S. PATENT DOCUMENTS

| | | | |
|---|---|---|---|
| 6,442,165 B1 * | 8/2002 | Sitaraman et al. | 370/395.4 |
| 2003/0217096 A1 * | 11/2003 | McKelvie et al. | 709/202 |

OTHER PUBLICATIONS

Cisco Systems, Radius Server Load Balancing, Mar. 2004, version 1.0.*

Nortel Networks, Alteon OS Product Brief, alteon_switch_2224.pdf, Dec. 31, 2002, Publisher: Nortel Networks at http://www.eads-telecom.com/images/administrables/42/, Published in: Internet—Research Triangle Park, NC, US.

Cisco Systems, Product Bulletin No. 1687, prod_bulletin09186, Jun. 20, 2005, pp. 10 Publisher: Cisco Systems at http://www.cisco.com/en/US/products/hw/routers/ps368/, Published in: Internet—San Jose, CA, US.

* cited by examiner

*Primary Examiner*—Chirag G Shah
*Assistant Examiner*—Srinivasa R Reddivalam
(74) *Attorney, Agent, or Firm*—Patent Capital Group

(57) ABSTRACT

Techniques for distributing network traffic from an access server to a service gateway include receiving, at a load balancer, sticky table data that indicates an association between a particular subscriber IP address and a particular subscriber-aware service gateway in a gateway cluster. An input data packet is received with an input source address and an input transport-layer destination. If it is determined that the input transport-layer destination indicates a type of payload that uses a service gateway, then the particular service gateway associated with the particular subscriber is determined based on the sticky table and IP address in the input source address. An output data packet is directed to the particular service gateway using a link-layer or networking-layer destination address. These techniques allow a load balancer to be located anywhere on the network and to bypass a subscriber-aware service gateway for some data traffic.

15 Claims, 4 Drawing Sheets

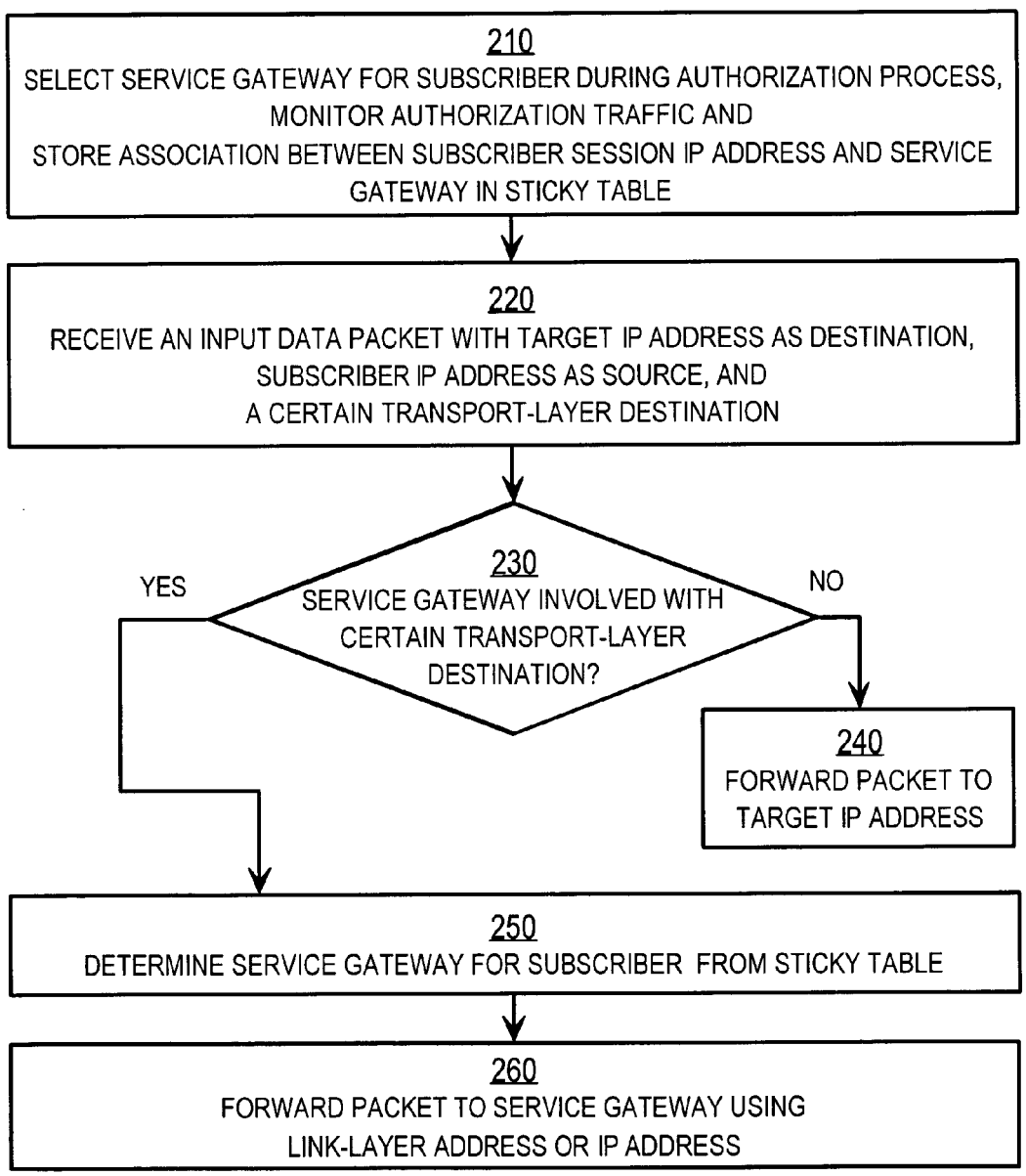

TECHNIQUES FOR LOAD BALANCING SUBSCRIBER-AWARE APPLICATION PROXIES

BACKGROUND OF THE INVENTION

1. Field of the Invention

The present invention relates to distributing data traffic load in a network among application proxies that are subscriber aware, such as service gateways that charge for application activity, with load balancers; and, in particular, to distributing the load with more flexibility for different services or different network distances between the load balancer and the application proxy, or both.

2. Description of the Related Art

Networks of general-purpose computer systems connected by external communication links are well known. The networks often include one or more network devices that facilitate the passage of information between the computer systems. A network node is a network device or computer system connected by the communication links. As used herein, an end node is a network node that is configured to originate or terminate communications over the network. In contrast, an intermediate network node facilitates the passage of data between end nodes.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. In networking parlance, a tunnel for data is simply a protocol that encapsulates that data.

Subscribers obtain access to a packet-switched network (PSN) of an Internet Service Provider (ISP) through a Network Access Server (NAS). A subscriber often uses a link-layer protocol to form a temporary tunnel between the subscriber's device and the NAS. The contents of the tunneling protocol payload are not involved in determining the path. The NAS determines whether an entity attempting access is in fact a subscriber authorized to access the network by exchanging packets with an Authentication, Authorization, and Accounting (AAA) server. Example well-known AAA servers include the Remote Authentication Dial In User Service (RADIUS) server, Terminal Access Controller Access Control System (TACACS), and the DIAMETER server. Once the entity is authenticated to be an authorized subscriber, then access is granted to the ISP network, the subscriber is assigned a network layer address, such as an Internet Protocol (IP) address, and internetwork-layer payloads are routed based on the internetwork and higher layer header information.

A modern ISP can offer different services to different subscribers. For example, the rate of data delivery of large Web pages to some subscribers can be increased by compressing the Web pages before delivery and un-compressing the Web pages at a process on the subscriber's own equipment. As is well known in the art, Web pages are transmitted using the Hypertext Transfer Protocol (HTTP), an application-layer (layer 7) protocol. Certain Web pages can be blocked using a Web filtering service. A service that provides some combination of compression, filtering and local caching of Web pages is called Web optimization. Some subscribers use mobile devices, such as cell phones, that have smaller memory and display capacities than other network devices. Web pages are communicated to such mobile devices using special protocols, such as the Wireless Application Protocol (WAP), an application-layer protocol. HTTP payloads are translated to WAP payloads before delivery to these subscribers.

To deliver these special services, service gateways are included in the ISP packet switched networks. Service gateways are processes that operate on intermediate network devices between the source and the destination of data packets. The service gateways use a payload in a data packet to provide the networking service. Example services include payload translation, just described, and other payload changes, as well as special billing, rating, filtering services and other services that do not modify the contents of a payload. For example, Web compression gateways compress HTTP payloads of data packets directed to a subscriber's device and un-compress HTTP payloads of data packets originating from a subscriber's device. A WAP 1.x gateway converts HTTP payloads of data packets directed to a subscriber's device to WAP 1.x payloads and converts WAP 1.x payloads of data packets originating from a subscriber's device to HTTP payloads. Some ISPs offer different services to different subscribers. These are subscriber-aware services.

To ensure that a service gateway for a service offered by the ISP is included in packet-switched paths from the subscriber to any destination on the network accessed by the ISP network, the service gateway is included as a proxy for an actual destination used to set up a subscriber's session on the network. For example, AAA server traffic for a NAS is directed to a service gateway, which serves as a proxy for the AAA server. A subscriber-aware service gateway monitors the AAA server traffic to determine the remote user's network identifier and whether the remote user has subscribed to the service provided by the gateway. For example, the service gateway monitors RADIUS to determine mapping of subscriber ID to currently assigned network ID; and, in addition, RADIUS is used to relay information on users' subscribed service profile to the network elements from a back-end database, typically behind the RADIUS server.

It is common for an ISP to include a cluster of service gateways so the service can be scaled to the number of subscribers. To distribute traffic among the service gateways in the cluster, a load balancer process is included in the path between the NAS (or other end node) and the cluster of service gateways. ISPs that include clusters of service gateways and load balancers also configure the load balancer as a proxy for the AAA server. For subscriber-aware services, the load balancer should send all traffic from the same subscriber, and the associated control plane traffic (RADIUS) generated by the NAS on this subscribers behalf, to the same service gateway in the cluster for the duration of the subscriber's network session. In some approaches, a sticky table is formed at the load balancer to store an entry that associates a particular subscriber with a particular service gateway for the duration of the session. When the session is ended, the entry is deleted from the sticky table. The sticky table is formed by monitoring the AAA traffic. Content-aware load-balancing is available from Cisco System, Incorporated of San Jose, Calif. as described in "Cisco IOS Software Release 12.1(11b)E for Supervisor Engines of the Cisco Catalyst 6500 Series Switch and Cisco 7600 Series Internet," Product Bulletin 1687, 2002, the entire contents of which are hereby incorporated by reference as if fully set forth herein. At the time of this writing, Product Bulletin 1687 is available at the Internet domain www.cisco.com in a file named prod_bulletin09186a00800923b0.htm in the directory /en/US/products/hw/routers/ps368.

While suitable for many purposes, there are some deficiencies with the prior approaches. One deficiency is that all traffic that comes through the NAS and hits the load balancer is directed to the service gateway cluster. This is not desirable for all traffic. For example, a WAP gateway or Web optimizer gateway is useful for HTTP payloads but the extra routing to the gateway and the gateway processing adds latency to the delivery of data from the mobile device. Increased latency is particularly undesirable for delay-sensitive applications such as a voice over IP. Thus it is preferable to directly route the voice over IP data and only send the Web traffic to the WAP or Web Optimizer gateway. Furthermore, directing all traffic to the service gateway increases the load on the service gateway.

Another deficiency is that current load balancers direct traffic to a service gateway using link-layer addresses. Such an approach requires that the service gateway cluster be connected to the same network segment as the load balancer. A network segment is a portion of the network between intermediate network nodes. In some circumstances it may be desirable to place the load balancers closer to each of multiple, widely-spaced NASs that are on different network segments. The requirement forces the ISP to place at least one service gateway on each network segment connected to a load balancer; and, makes it difficult for the ISP to cluster service gateways and achieve the benefits of greater scalability.

Based on the foregoing description, there is a clear need for service gateway load balancers that do not suffer all the deficiencies of prior art approaches. In particular there is a need for a service gateway load balancer that is subscriber aware and efficiently directs pertinent traffic to a service gateway but lets other traffic that does not use the service be routed directly to its destination. Also, there is a particular need for a service gateway load balancer that does not require the service gateway to be on the same network segment as the load balancer.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates a method at a high level for load balancing traffic for a service gateway, according to an embodiment;

DETAILED DESCRIPTION

A method and apparatus are described for distributing traffic to a service gateway. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Embodiments of the invention are illustrated with many examples in the context of a NAS and a WAP gateway, but the invention is not limited to this context. In other embodiments other service gateways are used to provide services to users on any end nodes, such as compression and optimization service gateways.

1.0 Network Overview

Figure 1A:
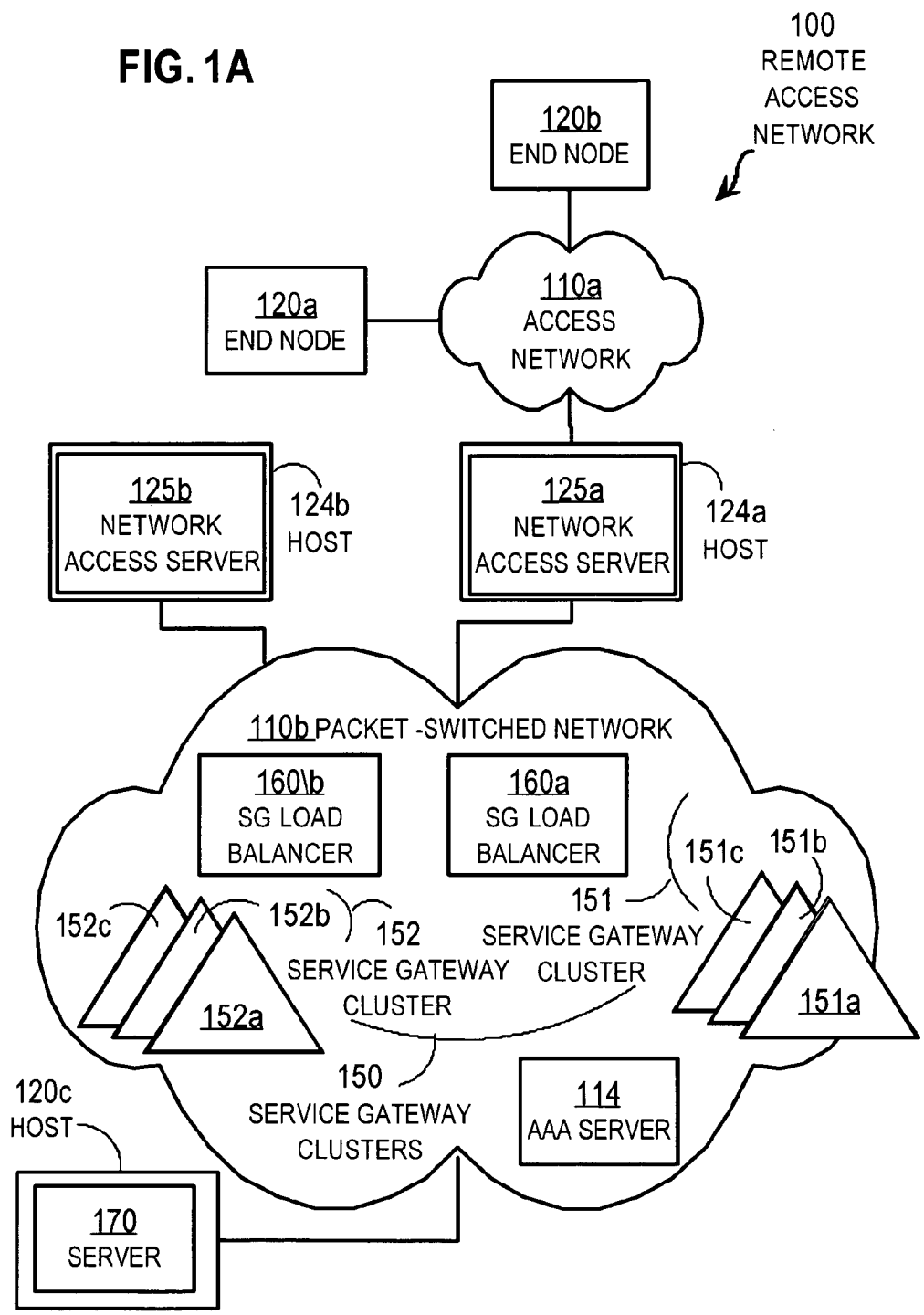
FIG. 1A is a block diagram that illustrates a remote access network that includes load balancers and service gateway clusters, according to an embodiment.

FIG. 1A is a block diagram that illustrates a remote access network 100 that includes load balancers 160 and service gateway clusters 150, according to an embodiment. A computer network is a geographically distributed collection of interconnected sub-networks (e.g., sub-networks 110a, 110b, collectively referenced hereinafter as sub-networks 110) for transporting data between nodes, such as computers. Each sub-network itself may be composed of one or more sub-networks. A local area network (LAN) is an example of a sub-network. The network's topology is defined by an arrangement of end nodes (e.g., end nodes 120a, 120b, 120c, collectively referenced hereinafter as end nodes 120) that communicate with one another, typically through one or more intermediate network nodes, such as a router or switch, that facilitates routing data between end nodes 120 on different sub-networks. Two sub-networks 110 that are typically involved in remote access are depicted in FIG. 1A. Each sub-network 110 may includes zero or more intermediate network nodes. An Internet Protocol (IP) packet-switched network (PSN) 110b is the target for remote access by users of end nodes 120a, 120b at one or more remote sites. The remote sites are connected to the PSN 110b through an access network 110a.

In various embodiments, access sub-network 110a is built, at least in part, on a telephone twisted pair, coaxial copper, optical cable or a wireless infrastructure. In various embodiments, access network 110a includes a controller for a bank of low-bandwidth modems, a digital subscription line (DSL) access module (DSLAM), or other coaxial cable or optical access modules. Although two end nodes 120a, 120b are depicted connected to access network 110a, in other embodiments more or fewer end nodes are connected to access network 110a. For mobile devices, the access network 110a includes circuitry and logic to maintain communication as the mobile device moves from one wireless access point (e.g., a mobile telephone cell antenna) to another.

Communications over sub-network 110a from end nodes 120a, 120b terminate at network access server (NAS) 125a executing on one or more hosts 124a. Other end nodes using other access networks terminate at other NAS, such as NAS 125b on host 124b. Although two NASs 125a, 125b (collectively referenced herein as NAS 125) are depicted connected to PSN 110b, in other embodiments more or fewer NASs are connected to PSN 110b. In various embodiments the NAS is a Broadband Remote Access Server (BRAS), a wireless access server, or some other server.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

PSN 110b is used by end nodes 120a, 120b at a remote site to communicate with another end node, such as host 120c on which executes server 170. PSN 110b includes AAA server 114, to authenticate the user of end nodes 120 attempting to access PSN 110b through any NAS 125.

To provide special subscriber-aware services, PSN 110b includes service gateway (SG) clusters 150 and SG load balancers (LB) 160a, 160b (collectively referenced herein as LB 160). Although two LBs 160 are shown in FIG. 1 for purposes of illustration, in other embodiments PSN 110b includes more or fewer LBs 160. SG clusters 150 include two clusters, SG cluster 151 and SG cluster 152. Each SG cluster includes two or more service gateways (SGs). In the illustrated embodiment each SG cluster includes three SGs. SG cluster 151 includes SG 151a, 151b, 151c; and SG cluster 152 includes SG 152a, 152b, 152c. Although two SG clusters of three SGs are shown in FIG. 1 for purposes of illustration, in other embodiments PSN 110b includes more or fewer SG clusters each with the same or different number of SGs.

To provide subscriber-aware services at load balanced SG clusters 150, a load balancer 160 and service gateway is inserted in the path from NAS 125 to AAA server 114, to determine what subscriber is associated with a particular address on network 110b. That is, the load balancer 160 advertises itself as resolving traffic directed to AAA server, then directs that traffic to one service gateway, e.g., SG 151a, in a SG cluster 150. That service gateway, e.g., SG 151a, snoops through the AAA messages exchanged between the NAS 125 and the AAA server 114, to determine if an IP address is associated with a subscriber for the service provided by the service gateway.

Figure 1B:
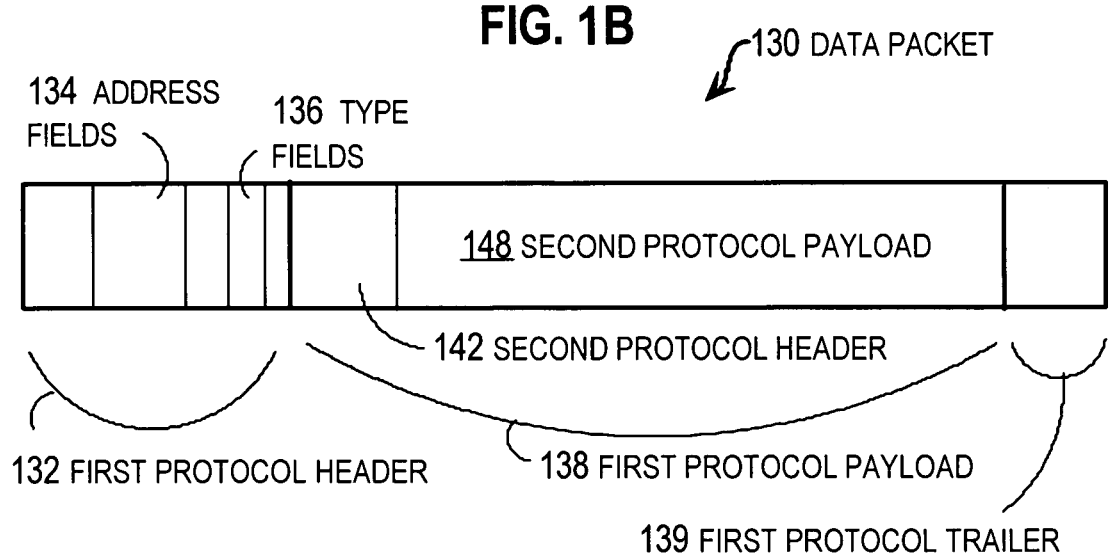
FIG. 1B is a block diagram that illustrates a generalized data packet communicated over a network.

FIG. 1B is a block diagram that illustrates a generalized data packet 130 communicated over a network, such as network 100. Each packet typically comprises one or more payloads of data, e.g. payloads 138, 148, each encapsulated by at least one network header, e.g., headers 132, 142, respectively. For example, payloads are encapsulated by appending a header before the payload, sometimes called prepending a header, and sometimes by appending a trailer after the payload. Each header 132, 142 is formatted in accordance with a network communication protocol; header 132 is formatted according to a first protocol and header 142 is formatted according to a second protocol. The header 142 for the second protocol is included within the payload 138 of the first protocol. As used herein a header for a particular protocol and its payload constitute a data packet for that protocol and may also be called a cell, frame, datagram or message for that protocol. In some publications data packets for different protocols are distinguished in shorthand by using a different one of the above terms for different protocols, e.g., to refer to Ethernet frames and IP datagrams, but here the terms are used interchangeably.

The header for a protocol typically includes type fields that identify the protocol to which the header belongs and the next protocol in the payload, if any. For example, the header 132 for the first protocol includes type fields 136. The header for a protocol often includes a destination address or a source address, or both, for the information in the payload. For example, the header 132 for the first protocol includes address fields 134 where the source and receiver address for the first protocol is located within the packet 130. As described above, a transmitted data packet's network headers include at least a physical-link (layer 1) header, a data-link (layer 2) header, and possibly an internetwork (layer 3) header and possibly a transport (layer 4) header.

The physical-link (layer 1) header defines the electrical, mechanical and procedural mechanisms for proper capture of a frame on a communication medium. A network interface contains the mechanical, electrical and signaling circuitry and logic used to couple a network node to one or more physical links. The layer 1 header may include a DSL or ATM or Ethernet layer 1 header, or some combination.

The data-link header provides information for transmitting a data packet over a particular physical link, such as information for transmitting a point-to-point link, Ethernet layer 2 link, wireless link, optical link, etc. An intermediate network node typically contains multiple physical links with multiple different nodes. To that end, the data-link header may specify a pair of "source" and "destination" network interfaces that are connected by a physical link. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the source and destination address within the computer network. Notably, the path may span multiple physical links. The internetwork header may be formatted according to the Internet Protocol (IP), which specifies IP addresses of both a source and destination node at the end points of the logical path.

Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

The transport header provides information for ensuring that the packet is reliably transmitted from the source node to the destination node. The transport header typically includes, among other things, source and destination port numbers that respectively identify particular software applications executing in the source and destination end nodes. More specifically, the packet is generated in the source node by a software application assigned to the source port number. Then, the packet is forwarded to the destination node and directed to the software application assigned to the destination port number. The transport header also may include error-checking information (e.g., a checksum) and other data-flow control information. For instance, in connection-oriented transport protocols such as the Transmission Control Protocol (TCP), the transport header may store sequencing information that indicates the packet's relative position in a transmitted stream of packets.

2.0 Virtual Server Load Balancer

FIG. 2 is a block diagram that illustrates a method 200 at a high level for load balancing traffic for a service gateway, according to an embodiment.

In step 210, an association is formed between a subscriber's IP address and a particular service gateway in a service gateway cluster. The association persists during the subscriber's session on the network. A session lasts from when a subscriber successfully logs onto the system by gaining authorization from the AAA server, until the user logs off (or times out), such as when a RADIUS stop message is sent. The session-long association can be formed in any manner known in the art. It's worth noting here that some NASs disable the authentication portion of RADIUS and use accounting messages to indicate the IP address assignment, and username to AAA and Service Gateways.

In the illustrated embodiment, as a proxy for the AAA server, the LB receives an AAA request from an end node or an access node for an adjacent network, such as from an NAS. The LB then selects one of the service gateways in a SG cluster that is appropriate for traffic from that NAS. For example, in some embodiments for a NAS that serves a mobile network, a particular WAP gateway (e.g., SG 152a) is selected in a WAP gateway cluster (e.g., cluster 152). Similarly, in some embodiments for a NAS that serves a low-bandwidth dial in access network, a particular Web compression gateway is selected in a Web compression gateway cluster. Similarly, in some embodiments for a NAS that serves a broadband access network, a particular Web optimization gateway is selected in a Web optimization gateway cluster. The service gateway selected within the cluster is based on any load balancing decision known in the art. For example, in some embodiments, the next service gateway is selected in a round-robin process; in some embodiments, the service gateway that shows the least backlog is selected. The AAA request is then forwarded to the selected service gateway, which forwards the request to the AAA server. The AAA server returns a response to the selected service gateway, which determines subscriber information based on the response and forwards the response to the load balancer. The load balancer also determines subscriber information based on the response, and forwards the response to the NAS. Thus the load balancer is in a control plane path between the AAA server and the NAS, and both the load balancer and service gateway can determine subscriber information, including the subscriber network identifier (e.g., IP address) for the session, for subscriber-aware services.

For purposes of illustration, it is assumed that mobile devices connect to the PSN 110b through NAS 125a and broadband connections to the PSN 110b come through NAS 125b. It is further assumed that SG cluster 151 is a WAP gateway cluster and SG cluster 152 is a Web optimization gateway cluster. It is yet further assumed that all AAA traffic from NAS 125a passes through LB 160a and all AAA traffic from NAS 125b passes through LB 160b. The AAA traffic terminates at AAA server 114.

During step 210, the LB monitors traffic between the AAA server and the NAS to determine a subscriber profile, including the IP address of an authorized subscriber in good account who is successfully authenticated. The IP address of the subscriber and the selected service gateway are stored as one entry in a data structure. The entry is retained in the data structure until later AAA traffic or some other condition indicates the subscriber at that IP address has signed off or timed out. Such a data structure is called a sticky table to indicate that entries reside in the table for more time than the time to process a single data packet, but are eventually removed at the end of a session. The end of the session is determined for example by the RADIUS flow, or via an idling mechanism. The sticky table may be formed or stored at the load balancer or on some other designated device or server on the ISP PSN 110b. In an illustrated embodiment, LBs 160a, 160b form and remove entries for a sticky table that itself is stored locally on the same load balancer device. In some embodiments, the LB receives the sticky table during step 210 that is formed or stored elsewhere, or both. Any method may be used to receive the sticky table, including, but not limited to: retrieving data stored locally in files or a database accessible to the load balancer, or from data included in a message sent to the load balancer by another server or client process, either unsolicited or in response to a request message sent by the load balancer.

Step 210 for some embodiments is already performed by some prior art systems. For example, load balancers from Cisco Systems of San Jose, Calif., construct a sticky table of associations between a subscriber IP address and a particular SG during session setup message exchanges with a RADIUS server. This process is described in Product Bulletin 1687, cited above.

In step 220, a data plane input data packet is received from an NAS. The input data packet has a target IP address as a networking-layer destination address of the networking (layer 3) header. The target IP address does not refer to a control plane server, such as AAA server 114. For purposes of illustration, it is assumed that the target IP address is the IP address of host 120c. The subscriber IP address is in the networking-layer source address of the networking header. The input data packet also indicates a certain transport-layer destination in the transport (layer 4) header. For example, the input data packet indicates a certain well-known port in a TCP header used as the transport header. A port of 80 indicates the application layer (layer 7) protocol is HTTP. A port of 9200, for example, indicates the application layer (layer 7) protocol is WAP. A port of 1300, for example, indicates the application layer (layer 7) protocol is a voice protocol.

In step 230, it is determined whether the transport layer destination holds a value that indicates a type of transport that involves a service provided by the service gateway. If so, control passes to step 250 to determine the service gateway. If not, control passes to step 240 to forward the data packet as directly as possible to the target IP address that appears in the input data packet networking layer destination.

In step 240, an output data packet is formed based on the input data packet to forward the data packet to the target IP address. For example, the networking layer and higher layer contents of the input data packet are transplanted to the output data packet, but the link-layer destination is changed to reflect the link that most advantageously sends the data packet closer to the target IP address. In many embodiments, step 240 includes determining the output data packet link-layer destination based on a routing table formed using a routing protocol, as is well known in the art. A device that uses a routing table to determine a link-layer destination for the next hop across a network is called a router.

In step 250, the service gateway associated with the subscriber who sent the input data packet is determined based on the sticky table. The IP address in the networking-layer source address is used as the subscriber IP address. The subscriber IP address is matched to one entry in the sticky table. The service gateway indicted in the one entry is the service gateway associated with that subscriber.

In step 260 an output data packet is sent to the associated service gateway based on the input data packet. For example, the networking layer and higher layer contents of the input data packet are transplanted to the output data packet, but the link-layer destination is changed to reflect the link-layer address of the service gateway, if the service gateway is on the same network segment as the load balancer. A service gateway on the same network segment as the load balancer is similar to current load balancers. Embodiments in which the service gateway is not on the same network segment are described in more detail below in a later section.

According to embodiments of the invention that include step 230, only traffic that benefits from the service provided by the service gateway is directed to the service. Other traffic is routed normally as directly as possible to the target IP address. Thus HTTP application layer payloads are directed to WAP or Web optimizer gateways, while voice over IP application layer payloads are routed normally, bypassing those service gateways. Including step 230 eliminates one deficiency of prior art load balancers, as described in the background section.

Figure 3:
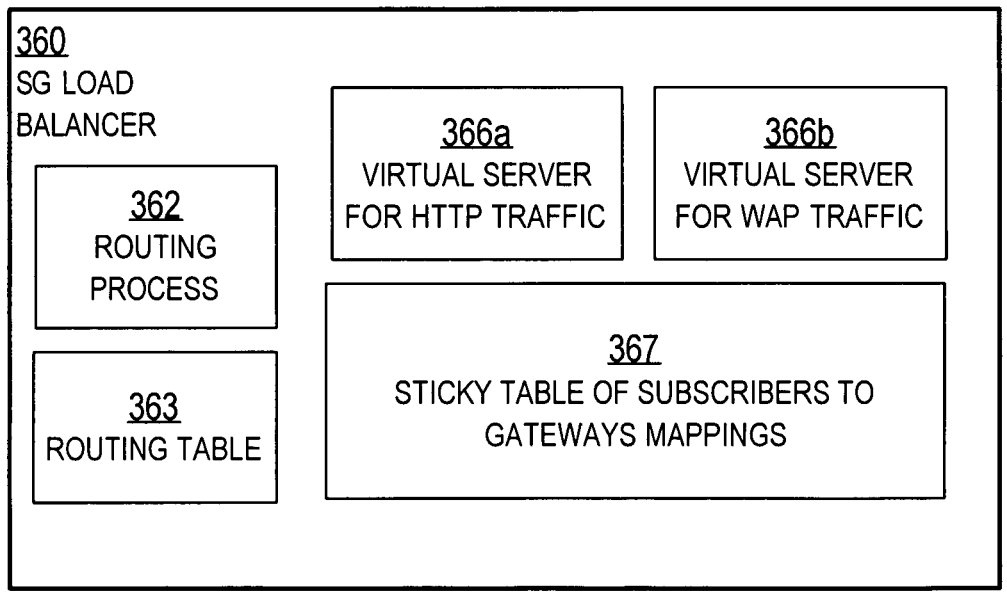
FIG. 3 is a block diagram that illustrates a service gateway load balancer, according to an embodiment.

In some embodiments, steps 230, 250, 260 are implemented as a virtual server for a transport layer destination that involves the service gateway, as described in more detail below with reference to FIG. 3.

In some embodiments, step 230 is omitted and all traffic received at a load balancer from a subscriber is forwarded to the selected service gateway associated with that user, as occurs with current load balancers.

In an illustrated embodiment, the method 200 is performed by a process called a service gateway load balancer operating on a router, as described with reference to FIG. 3. FIG. 3 is a block diagram that illustrates a SG LB router 360, according to an embodiment. SG LB router 360 is a particular embodiment of SG LB 160 depicted in FIG. 1A.

LB router 360 includes a routing table 363 and routing process 362. The routing table is a data structure that associates each of multiple interfaces on the router 360 with a set of zero or more networking layer addresses, such as IP addresses. The routing process 362 maintains the contents of routing table 363 based on data packets received on each interface and one or more of many well-known routing protocols.

According to some embodiments of the invention, LB router 360 includes the sticky table data structure 367. As described above, the sticky table 367 stores an association between a subscriber's IP address and a particular service gateway in a cluster of service gateways for the duration of the subscriber's session.

According to some embodiments of the invention, LB router 360 includes one or more virtual servers 366 for different application-layer protocols received from an NAS or end node that employ a service gateway. In the illustrated embodiment, LB router 360 includes two virtual servers, virtual server 366a for data packets received from an NAS or other end node with the HTTP application-layer protocol, and virtual server 366b for data packets received from an NAS with the WAP application-layer protocol. The HTTP application-layer protocol is indicated by a destination port 80 in the transport header of the data packet received from a NAS. The WAP application-layer protocol is indicated by a destination port, e.g., 9200, in the transport header of the data packet received from a NAS. The port numbers used in this description are for purposes of illustration only. In other embodiments, other well-known port numbers or ranges of port numbers are used to indicate WAP and voice protocols.

When a data packet is received with an application-layer protocol that has a virtual server 366 on the LB router 360, as determined by the transport-layer destination port, the data packet is directed to that virtual server 366 for processing according to the TCP protocol widely implemented on routers. The virtual server 366 performs steps 250 and 260 of method 200 for the associated application-layer protocol. When a data packet is received with an application-layer protocol that does not have a virtual server 366 on the LB router, the data packet is routed according to its networking-layer destination using the routing process 362 and routing table 363. Thus, by using virtual servers 366 on routers, steps 230 and 240 are implemented using the TCP process already widely implemented on routers; and steps 250 and 260 are performed by the virtual servers 366.

For purposes of illustration, it is assumed that SG LBs 160a is a LB router 360 configured to receive all traffic from NAS 125a and 125b. It is also assumed, as described above, that SG cluster 151 is a WAP gateway cluster and SG cluster 152 is a Web optimization cluster. It is also assumed, as described above, that NAS 125a receives WAP traffic and NAS 125b receives HTTP traffic for broadband devices.

As a first example, it is further assumed that Smith, a subscriber for WAP service in good accounts, is using mobile end node 120a to sign on to PSN 110b through wireless access network 110a and NAS 125a. A tunnel is generated for Smith to send data packets from end node 120a to NAS 125a. In response to establishing the tunnel from end node 120a to NAS 125a, NAS 125a prompts Smith for a network user identifier (user ID) and password using the display on end node 120a; and sends an AAA authorization request with the ID and password to SG LB 160a.

In step 210, an AAA control plane proxy (not shown) on LB 360 receives the AAA authorization request from NAS 125a. Since NAS 125a serves wireless subscribers on access network 110a, the AAA control plane proxy selects a WAP gateway, e.g., 151b, from WAP gateway cluster 151, using a load balancing process (not shown). The AAA control plane proxy sends the AAA authorization request to the selected WAP gateway 151b. WAP gateway 151b forwards the request to AAA server 114. The AAA server determines the user ID is an authorized subscriber in good account and that the password authenticates the user of end node 120a as the authorized user. Based on this, the AAA server 114 returns an AAA accept message with the Smith end node 120a IP address (called the Smith IP address hereinafter) to WAP gateway 151b. WAP gateway 151b forwards the AAA accept message to the AAA control plane proxy on LB 360. The AAA control plane proxy stores the Smith IP address in association with the IP address for WAP gateway 151b in the sticky table 367. The AAA control plane proxy forwards the AAA accept message to the NAS 125a. Further negotiations between Smith and AAA server 114 start the current session for Smith and the AAA control plane proxy on LB 360 stores the additional information about Smith with the Smith IP address and the IP address for WAP gateway 151b in the sticky table 367.

In step 220, a data plane input data packet is forwarded by NAS 125a from Smith IP address to LB 360. The input data packet includes the Smith IP address as the networking-layer source address, a URL or IP address for a particular Web page host, e.g., host 120c, as the target, and a transport destination port, e.g., 9200, that indicates a WAP application-layer protocol.

In step 230, the data packet is forwarded to virtual WAP server 366b based on the transport destination port, e.g., 9200. The virtual WAP server 366b performs steps 250 and 260. In step 250, the WAP virtual server 366b determines from the sticky table 367 that the Smith IP address is associated with WAP gateway 151b, and the data packet is forwarded to the WAP gateway 151b during step 260. Thus the LB always sends a packet to the service gateway that is aware of the special services subscribed by the subscriber.

Similarly, an authenticated and authorized subscriber Jones accessing ISP PSN 110b through NAS 125b using broadband is directed to Web optimization gateway 152c in Web optimization cluster 152 and that gateway 152c is associated in sticky table 367 with a Jones IP address during step 210.

In step 220, a data plane input data packet is forwarded by NAS 125b from Jones IP address to LB 360. The input data packet includes the Jones IP address as the networking-layer source address, a URL or IP address for a particular Web page host, e.g., host 120c, as the target and a transport destination port of 80 that indicates an HTTP application-layer protocol.

In step 230, the data packet is forwarded to virtual HTTP server 366a based on the transport destination port of 80. The virtual HTTP server 366a performs steps 250 and 260. In step 250, the HTTP virtual server 366a determines from the sticky table 367 that the Jones IP address is associated with Web optimization gateway 152c, and the data packet is forwarded to the Web optimization gateway 152c during step 260.

If, instead, the transport destination port of a data packet received in step 220 is not a WAP port number and is not 80, then it is not forwarded to either virtual server 366a, 366b during step 230. Instead, during step 230, the input data packet is directed to routing process 362. The input data packet is routed by routing process 362 using the routing table 363 directly to host 120c for server 170, after the URL for server 170, if any is resolved. Thus traffic that does not use services of a service gateway bypass the service gateway. This provides an advantage over prior art approaches.

In some embodiments, each LB 160 includes a different virtual service gateway to reflect different services used at different NASs. For example, virtual server 366b is included in LB 160a near a NAS that serves wireless access network, but virtual server 366a for HTTP traffic is omitted. Similarly, virtual server 366a is included in LB 160b near a NAS that serves broadband access network, but virtual server 366b for WAP traffic is omitted.

3.0 Internet Layer Forwarding to Service Gateway

In some embodiments, the service gateway is not on the same network segment as the load balancer. Also, in some embodiments, one of the service gateways is local, and another is not on the same network. In such embodiments, step 260 includes changing the networking layer destination from the target IP address, to the IP address of the associated service gateway. In such embodiments the link-layer destination is also changed to reflect the data link that most advantageously sends the data packet closer to the IP address of the associated service gateway. In many embodiments, step 260 includes determining the output data packet link-layer destination based on a routing table formed using a routing protocol, as is well known in the art.

In some such embodiments the load balancer includes in the sticky table a field that indicates the original target IP address, so that return messages from the service gateway that are forwarded by the load balancer to the NAS can show a source IP address that indicates the target IP address the subscriber appears to be communicating with. That is, the load balancer acts as a proxy for the application indicated by the transport destination on the host with the target IP address.

Allowing step 260 to change the networking-layer destination address eliminates the deficiency of prior art load balancers that require the service cluster gateway to be connected to the same network segment as the load balancer, as described in the background section. Thus, load balancers may be distributed to be near NASs even while the service gateway clusters 150 are concentrated in a single or few geographic locations. For example, NAS 125a can be located in New York City and NAS 125b can be located in San Francisco, both for wireless communications. With networking-layer routing from load balancers to service gateway clusters, LB 160a can be located in New York City near NAS 125a, while LB 160b can be located in San Francisco near NAS 125b. A service gateway cluster, such as WAP gateway cluster 151 can be located in either city or closer to some other facility, such as RADIUS server 114 in Chicago.

Another advantage of these embodiments is that a network node at an edge of the subscriber network can be configured with a single AAA server and single service gateway address, such as a single WAP gateway load balancer address, for the load balancer closest to the subscriber edge.

4.0 Implementation Mechanisms—Hardware Overview

Figure 4:
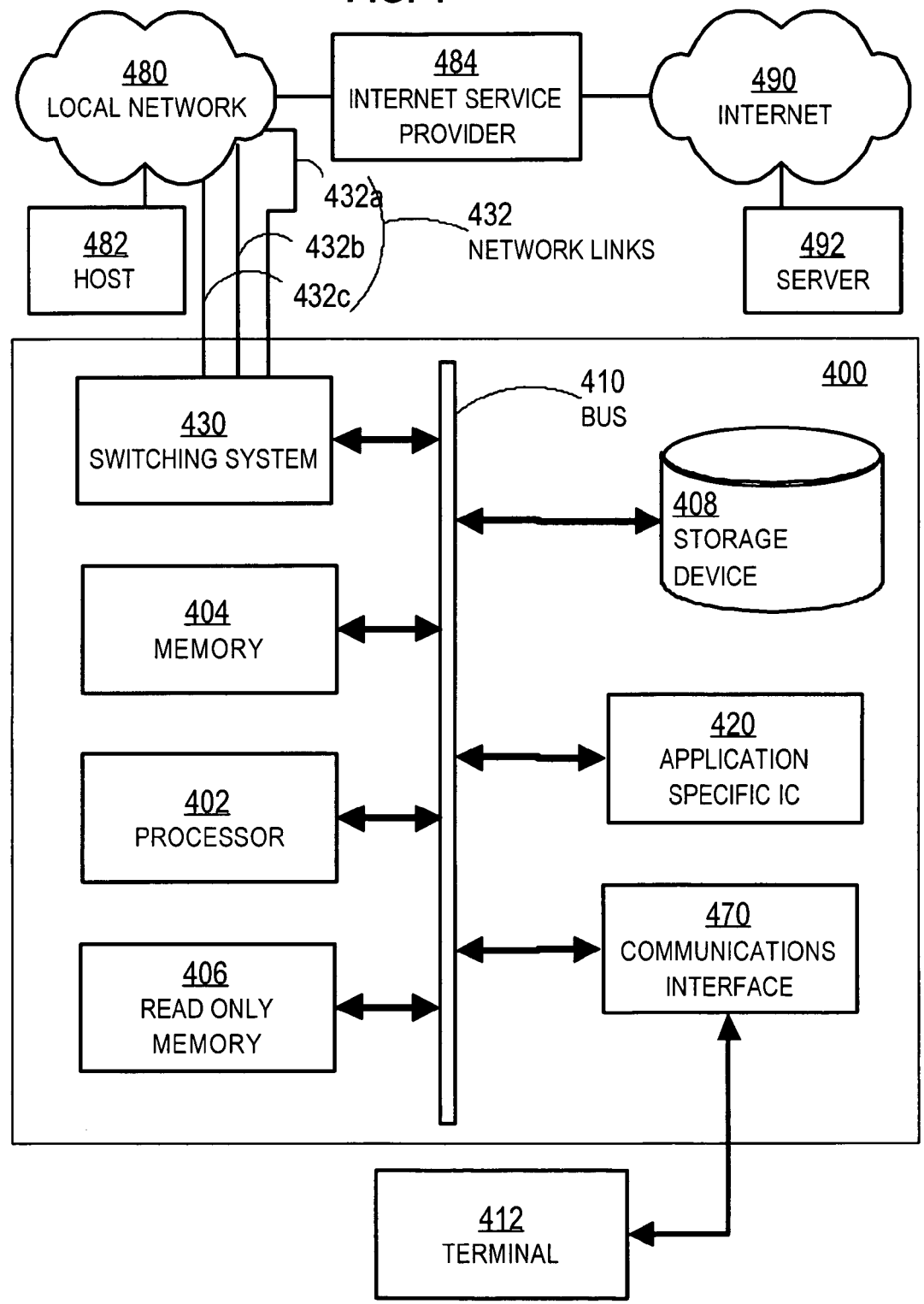
FIG. 4 is a block diagram that illustrates a computer system, such as a router, upon which an embodiment of the invention may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism, such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, and fiber optic cables.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for distributing traffic from an end node to a service gateway on a packet switched network, comprising the steps of:

receiving sticky table data that indicates an association between a particular subscriber and a particular service gateway, wherein the sticky table data is received at a loadbalancer router configured to distribute requests to a plurality of network nodes, the loadbalancer router being further configured to include a first virtual server for processing HTTP flows and a second virtual server for processing wireless application protocol (WAP) flows, and wherein if an incoming packet is not matched to a port for an HTTP flow or a WAP flow, then the incoming packet is routed using a routing table in the loadbalancer router;

receiving a data plane input data packet with an input source address that indicates the particular subscriber, and an input transport-layer destination;

determining the particular service gateway associated with the particular subscriber based on the sticky table, and directing an output data packet based on the input data packet to the particular service gateway, wherein a Wireless Access Protocol (WAP) is employed to convert between HTTP payloads and WAP payloads in providing a networking service.

2. A method as recited in claim 1, wherein:

a particular gateway cluster is one gateway cluster among a cluster set of one or more gateway clusters that provide corresponding networking services; and the method further comprises the step of directing an output packet based on the input packet to a network node different from any gateway of the cluster set, if it is determined that the input transport-layer destination indicates a type of payload that does not use networking services provided by any gateway cluster of the cluster set.

3. A method as recited in claim 1, wherein a Hypertext Transport Protocol (HTTP) payload uses a networking service that includes at least one of Web optimization, Web compression, Web page filtering.

4. A method as recited in claim 1, wherein a voice over Internet Protocol (IP) does not use a networking service provided by a service gateway.

5. A method as recited in claim 1, wherein directing the output data packet to the particular service gateway further comprises, setting a link-layer destination address in the output data packet to a link-layer address for the particular service gateway on a network segment of the packet switched network.

6. A method as recited in claim 1, wherein directing the output data packet to the particular service gateway further comprises, setting a networking-layer destination address in the output data packet to a networking-layer address for the particular service gateway on the packet switched network.

7. A system for distributing traffic from a network access server to a service gateway on a packet switched network, comprising:
    means for receiving sticky table data that indicates an association between a particular subscriber and a particular service gateway, wherein the sticky table data is received at a loadbalancer router configured to distribute requests to a plurality of network nodes, the loadbalancer router being further configured to include a first virtual server for processing HTTP flows and a second virtual server for processing wireless application protocol (WAP) flows, and wherein if an incoming packet is not matched to a port for an HTTP flow or a WAP flow, then the incoming packet is routed using a routing table in the loadbalancer router;
    means for receiving a data plane input data packet with an input source address that indicates the particular subscriber, and an input transport-layer destination; and
    means for directing an output data packet based on the input data packet to the particular service gateway, wherein a Wireless Access Protocol (WAP) is employed to convert between HTTP payloads and WAP payloads in providing a networking service.

8. A system for distributing traffic from a network access server to a service gateway on a packet switched network, comprising:
    means for receiving sticky table data that indicates an association between a particular subscriber and a particular service gateway, wherein the sticky table data is received at a loadbalancer router configured to distribute requests to a plurality of network nodes, the loadbalancer router being further configured to include a first virtual server for processing HTTP flows and a second virtual server for processing wireless application protocol (WAP) flows, and wherein if an incoming packet is not matched to a port for an HTTP flow or a WAP flow, then the incoming packet is routed using a routing table in the loadbalancer router;
    means for receiving a data plane input data packet with an input source address that indicates the particular subscriber;
    means for directing an output data packet based on the input data packet to the particular service gateway, wherein a Wireless Access Protocol (WAP) is employed to convert between HTTP payloads and WAP payloads in providing a networking service, and wherein the means for directing the output data packet to the particular service gateway further comprises means for setting a link-layer destination address in the output data packet to a link-layer address for the particular service gateway on a network segment of the packet switched network.

9. An apparatus for distributing traffic from a network end node to a service gateway on a packet switched network, comprising:
    a network interface that is coupled to a provider network for communicating therewith a data packet;
    one or more processors;
    a computer-readable storage medium; and
    one or more sequences of instructions stored in the computer-readable storage medium, which, when executed by the one or more processors, causes the one or more processors to carry out the steps of:
        receiving sticky table data that indicates an association between a particular subscriber and a particular service gateway, wherein the sticky table data is received at a loadbalancer router configured to distribute requests to a plurality of network nodes, the loadbalancer router being further configured to include a first virtual server for processing HTTP flows and a second virtual server for processing wireless application protocol (WAP) flows, and wherein if an incoming packet is not matched to a port for an HTTP flow or a WAP flow, then the incoming packet is routed using a routing table in the loadbalancer router;
        receiving a data plane input data packet with
        an input source address that indicates the particular subscriber, and
        an input transport-layer destination;
        determining the particular service gateway associated with the particular subscriber based on the sticky table, and
        directing an output data packet based on the input data packet to the particular service gateway, wherein a Wireless Access Protocol (WAP) is employed to convert between HTTP payloads and WAP payloads in providing a networking service.

10. An apparatus as recited in claim 9, wherein:
    a particular gateway cluster is one gateway cluster among a cluster set of one or more gateway clusters that provide corresponding networking services; and
    execution of the one or more sequences of instructions further causes the one or more processors to carry out the step of directing an output packet based on the input packet to a network node different from any gateway of the cluster set, if it is determined that the input transport-layer destination indicates a type of payload that does not use networking services provided by any gateway cluster of the cluster set.

11. An apparatus as recited in claim 9, wherein a Hypertext Transport Protocol (HTTP) payload uses a networking service that includes at least one of Web optimization, Web compression, Web page filtering.

12. An apparatus as recited in claim 9, wherein a voice over Internet Protocol (IP) does not use a networking service provided by a service gateway.

13. An apparatus as recited in claim 9, wherein directing the output data packet to the particular service gateway further comprises, setting a link-layer destination address in the output data packet to a link-layer address for the particular service gateway on a network segment of the packet switched network.

14. An apparatus as recited in claim 9, wherein directing the output data packet to the particular service gateway further comprises, setting a networking-layer destination address in the output data packet to a networking-layer address for the particular service gateway on the packet switched network.

15. An apparatus for distributing traffic from a network access server to a service gateway on a packet switched network, comprising:
    a network interface that is coupled to a provider network for communicating therewith a data packet;
    one or more processors;
    a computer-readable storage medium; and
    one or more sequences of instructions stored in the computer-readable storage medium, which, when executed by the one or more processors, causes the one or more processors to carry out the steps of:

receiving sticky table data that indicates an association between a particular subscriber and a particular service gateway, wherein the sticky table data is received at a loadbalancer router configured to distribute requests to a plurality of network nodes, the loadbalancer router being further configured to include a first virtual server for processing HTTP flows and a second virtual server for processing wireless application protocol (WAP) flows, and wherein if an incoming packet is not matched to a port for an HTTP flow or a WAP flow, then the incoming packet is routed using a routing table in the loadbalancer router;

receiving a data plane input data packet with an input source address that indicates the particular subscriber;

directing an output data packet based on the input data packet to the particular service gateway, wherein a Wireless Access Protocol (WAP) is employed to convert between HTTP payloads and WAP payloads in providing a networking service, and wherein the loadbalancer router is further configured to set a link-layer destination address in the output data packet to a link-layer address for the particular service gateway on a network segment of the packet switched network.

* * * * *